March 4, 1969  D. R. NELSON  3,430,990

COUPLING

Filed Nov. 2, 1966

INVENTOR
Donald R. Nelson
BY
Wolf, Greenfield & Hieken

United States Patent Office 3,430,990
Patented Mar. 4, 1969

3,430,990
COUPLING
Donald R. Nelson, Worcester, Mass., assignor to Goddard Industries, Inc., Worcester, Mass., a corporation of Massachusetts
Filed Nov. 2, 1966, Ser. No. 591,565
U.S. Cl. 285—158    2 Claims
Int. Cl. F16l 37/00, 41/00

ABSTRACT OF THE DISCLOSURE

A coupling for a vacuum system in which a tube is secured in alignment with an opening in the wall of the system. A sleeve is welded within an annular flange on the wall. The sleeve has an internal, annular shoulder section coaxial with the tube and within which the resilient O-ring is positioned. A nut has a threaded shank which threads into the sleeve and compresses the O-ring so that it exerts radial force against the tube. A washer is interposed between the O-ring at the end of the shank of the nut.

---

The present invention relates to a coupling for a vacuum system.

Heretofore, couplings for vacuum systems and particularly high-vacuum systems, have been expensive to make and are frequently complicated in design. In the couplings heretofore used for high-vacuum systems, extreme care in manufacture was required in a number of dimensions in order to minimize and avoid leakage. Many of these prior art constructions require a plurality of threaded members and walls which are machined to exacting specifications. In adidtion, some of these couplings are bulky and unnecessarily extend the length of the vacuum system. Further, some of these couplings have junctions or closures which, because of the bulk of the coupling, are remote from the vacuum source.

Many of these couplings are susceptible to damage while they are being brazed or otherwise secured to the vacuum system since they include threaded segments which are exposed to the brazing tools or are near the brazed area. In addition, many of these couplings must be made of relatively expensive materials which are hard to work, such as stainless steel.

It is an object of the present invention to provide an improved vacuum system coupling which is inexpensive to manufacture, efficient in operation, and easy to open.

It is also an object of the present invention to provide a design for an improved vacuum system coupling in which couplings may be made of material other than stainless steel with a minimum number of surfaces that must be carefully matched. A still further objects of the present invention is to provide a design for an improved vacuum system coupling means in which the likelihood of leakage is minimized.

In the preferred embodiment of the present invention, there is provided a coupling for a vacuum system in which a tube is removably connected to a wall of the vacuum system. in this arrangement, a sleeve member having an axially extending opening is longitudinally aligned with an opening in the wall of the system member. The sleeve member is secured to the wall by an annular flange integrally formed with the wall, with the sleeve and annular flange welded together by an annular weld. The sleeve member is provided with an annular shoulder intermediate its ends which is sized to provide an annular recess between the sleeve and the tube. The sleeve is internally threaded to receive a nut having a shank and head with an axial aperture through the shank and head. The shank of the nut is threadingly engaged with the threads of the sleeve and compresses a washer and resilient O-ring positioned within the annular shoulder whereby the O-ring is compressed.

Figure 1:
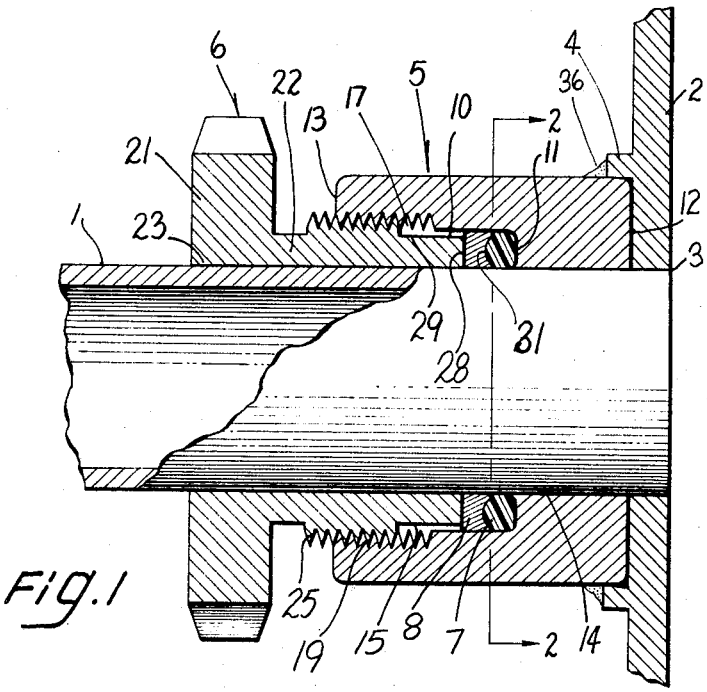
Figure 2:
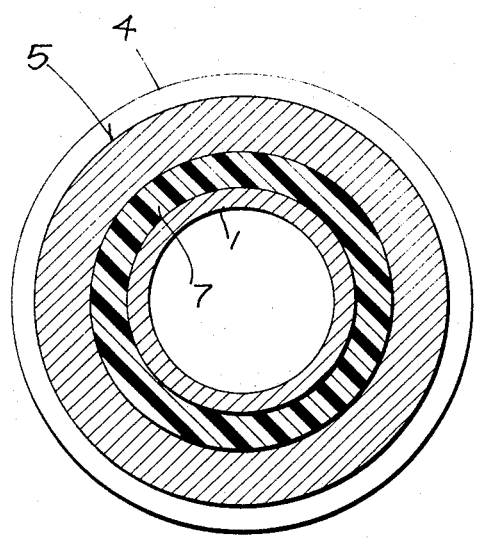

These and other objects and advantages of the present invention will be more clearly understood when considered in conjunction with the accompanying drawings in which:

FIG. 1 is a sectional view of the present invention embodied in the vacuum system; and FIG. 2 is a cross-sectional view taken along the line 2—2 of FIG. 1.

The coupling of the present invention is designed primarily for use in high take out vacuum systems in which it may be frequently desirable to disconnect a vacuum tube 1 from a chamber or other member 2 of the vacuum system. The member 2 is provided with an opening 3 with which the tube 1 is designed to be aligned or through which the tube 1 is to extend. Ordinarily, these apertures 3 are provided with an annular flange 4, or counterbored or the like that extend outwardly of the member 2 and are designed to act or form a receiving means for the coupling.

The coupling comprises a sleeve member 5 and a nut 6 adapted to interengage with the sleeve 5 and secure and compress an O-ring 7 into a friction, vacuum-type seal against the tube 1, with a washer 8 interposed between the nut 6 and O-ring 7.

The sleeve 5 is formed with an axially extending opening 10 longitudinally aligned with the opening 3 in the member 2. This opening 10 is formed with an annular shoulder section 11 intermediate the ends 12 and 13 of the sleeve 5. The diameter of the opening 10 on one side 14 of the shoulder section 11 is sized to engage the outer wall of the tube 1. This diameter, thus, is substantially equal to the diameter of the tube 1, and is designed to receive the tube in a relatively snug, but movable fit. The diameter on the other side of the shoulder 11, as illustrated at 15, is sized to form an annular recess 17 between the sleeve member 5 and the tube 1. The wider diametered end of the opening 10 is threaded at 19 from the end 13 to a point approximately half-way down the annular recess 17. The nut 6 comprises a head 21 and a shank 22. The head 21 is preferably hexagonal in shape so as to be gripped by a rotating tool. An aperture 23 extends through the head 21 and shank 22. This aperture 23 is equal to the aperture through a sleeve member 5 and is designed, when the coupling is assembled, to be aligned with it. This aperture 23 has a diameter sized to engage the outer wall of the tube 1 in a snug, but movable fit, with the tube 1 extending entirely through the aperture 23. The shank 22 is externally threaded at 25 with the threads 25 adapted to engage the threads 19 on the inner wall of the sleeve member 5. These threads 25 extend short of end 28 of the shank 22. The threads 25 project outwardly from the outer diameter of the shank at the leading edge 29.

The O-ring 7 is positioned in engagement with the walls of the shoulder 11, and is maintained under a compressive force so that it fits tightly and in a frictional engagement with the outer wall of the tube 1. Pressure is exerted against the O-ring 7 by means of washer 8 which has an inner diameter substantially equal to the diameter of the aperture 23 and 3. This washer 8, which may be made of plastic or metal, may be formed with an arcuate surface 31 adapted to engage and exert pressure on the O-ring 7. The minimum diameter of the O-ring is approximately equal to the outer diameter of the tube 1 which provides sufficient frictional engagement and pressure between the O-ring surface and the tube 1 when under compressive force from the nut 6 to preclude the introduction of the air into the vacuum system under normal conditions.

The sleeve member 5 is secured within the annular flange 4 by suitable means as, for example, by a brazing 36 between the annular flange 4 and the outer wall of the sleeve member 5.

It will be noted that sleeve member 5 is theaded only on its internal surface as indicated at 19, and that it is only along this surface between the threads 19 and the outwardly extending wall of the shoulder section 11 that the coupling must be machined with care. The outer surface of the sleeve member may be rough finished or centerless ground for appearance. The outer surface can be welded to the vacuum system 2 without the likelihood of inadvertent brazing of the threads 19. It will also be noted that the O-ring is positioned quite close to the end 12 of the sleeve member and, consequently, quite close to the vacuum system member 2.

The nut 6 can be formed of a hex stock on a screw machine which is center drilled and reamed.

What is claimed is:

1. A coupling for a vacuum system wherein a tube is removably connected to a member of said system comprising a wall having an opening therethrough a sleeve member with an axially extending opening longitudinally aligned with said opening in said a wall of said system member, said wall opening and sleeve member opening being equal in diameter:

means securing said sleeve member to said wall with the base of said sleeve member in facing and abutting relation with said wall comprising an annular axially extending flange integrally formed on said wall having an inner side positioned in facing and abutting relation with the outer side of said sleeve member and an annular weld interconnecting said outer side and the free end of said flange, said sleeve member opening having an annular shoulder section intermediate its ends, the diameter on one side of said shoulder section sized to engage the outer wall of said tube, the diameter of the other side of said shoulder section sized to form an annular recess between said sleeve member and said tube, said other side of said shoulder section being threaded at least partially from the end remote from said shoulder, a nut having a shank and head with an axial aperture extending through said shank and head and having a diameter sized to engage the outer wall of said tube with said tube extending therethrough, said shank being externally threaded with threads engaging the threads on the inner wall of said sleeve member, a resilient O-ring positioned within said annular recess in abutting engagement with said shoulder and having an inner diameter approximately equal to the outer diameter of said tube whereby said O-ring normally engages said tube in snug engagement, and a washer positioned on said tube intermediate said O-ring and the end of said shank with said washer having an inner edge engaging the outer wall of said tube and an outer edge engaging said other side of said shoulder section and said washer retained in pressured engagement with said O-ring by said shank.

2. A device as set forth in claim 1 wherein said washer is arcuately curved on the surface thereof engaging said O-ring and said shank is threaded intermediate its ends.

UNITED STATES PATENTS

References Cited

| | | | |
|---|---|---|---|
| 931,128 | 8/1909 | Keith | 277—112 |
| 1,805,155 | 5/1931 | Weeks | 285—159 X |
| 2,282,738 | 5/1942 | Moore | 285—348 X |
| 2,366,688 | 1/1945 | Eisenbeis | 285—158 |
| 2,499,024 | 2/1950 | Hollyday | 285—348 |
| 2,703,719 | 3/1955 | Crothers | 285—356 |

FOREIGN PATENTS

| | | |
|---|---|---|
| 130,711 | 5/1902 | Germany. |
| 1,138,332 | 10/1962 | Germany. |
| 137,086 | 12/1919 | Great Britain. |
| 840,220 | 7/1960 | Great Britain. |

CARL W. TOMLIN, *Primary Examiner.*

D. W. AROLA, *Assistant Examiner.*

U.S. Cl. X.R.

277—112, 188; 285—346, 348, 356, 286